US007007587B2

(12) United States Patent
Zanden

(10) Patent No.: US 7,007,587 B2
(45) Date of Patent: Mar. 7, 2006

(54) SNAP-IN ROTATABLE CYLINDER CONTROL

(75) Inventor: James Vander Zanden, Grand Haven, MI (US)

(73) Assignee: Suspa Incorporated, Grand Rapids, MI (US)

( * ) Notice: Subject to any disclaimer, the term of this patent is extended or adjusted under 35 U.S.C. 154(b) by 308 days.

(21) Appl. No.: 10/625,324

(22) Filed: Jul. 23, 2003

(65) Prior Publication Data

US 2005/0022661 A1 Feb. 3, 2005

(51) Int. Cl.
*A47C 1/06* (2006.01)

(52) U.S. Cl. .................................... 91/437; 297/344.19

(58) Field of Classification Search .................. 91/437; 60/494; 297/344.19

See application file for complete search history.

(56) References Cited

U.S. PATENT DOCUMENTS 2,579,305 A 12/1951 Cushman
3,711,054 A 1/1973 Bauer
3,988,001 A 10/1976 Kankaras
4,072,288 A 2/1978 Wirges et al.
4,096,785 A 6/1978 Wirges
4,124,202 A 11/1978 Hatakeyama
4,354,398 A 10/1982 Porter
4,415,135 A 11/1983 French
4,495,237 A 1/1985 Patterson
4,595,237 A 6/1986 Nelsen
4,979,718 A * 12/1990 Bauer et al. ........... 297/344.19
5,090,770 A 2/1992 Heinrichs et al.
5,141,210 A 8/1992 Bauer et al.
5,577,804 A * 11/1996 Tedesco ................. 297/344.19
5,636,899 A 6/1997 Schiff et al.
5,826,935 A 10/1998 DeFreitas
5,829,733 A 11/1998 Becker
5,899,530 A 5/1999 Tedesco
5,915,674 A 6/1999 Wolf et al.
6,019,429 A 2/2000 Tedesco
6,045,187 A 4/2000 Stumpf
6,276,756 B1 8/2001 Cho et al.
6,382,077 B1 * 5/2002 Chen ........................... 91/437
6,474,619 B1 * 11/2002 Ma ....................... 297/344.19

* cited by examiner

*Primary Examiner*—Edward K. Look
*Assistant Examiner*—Michael Leslie
(74) *Attorney, Agent, or Firm*—Price, Heneveld, Cooper, DeWitt & Litton

(57) ABSTRACT

A control for a fluid cylinder includes a cylindrical housing made of a polymeric material which pivotally receives a control arm having a cable release receiving member at one end and which can be snap-fitted within an open end of a pneumatic cylinder to lockably engage a valve spacer manufactured as part of the cylinder. With such a system, the control can be installed in the cylinder and rotated to position the cable release in any orientation within a 360° adjustment range to allow proper alignment of the cable release.

24 Claims, 4 Drawing Sheets

SNAP-IN ROTATABLE CYLINDER CONTROL

BACKGROUND OF THE INVENTION

The present invention relates to a control for use in connection with an adjustable pneumatic cylinder.

Pneumatic adjustment cylinders are frequently employed for adjusting a movable member with respect to a fixed base. Frequently, such cylinders are employed in connection with adjustable height office chairs, tables, and the like. In the past, controls for actuating the valves for such adjustable cylinders have been manufactured such that they position the cable control in a direction for mounting to the chair or table in a particular orientation, such as the left side, right side, center or other location. In such installations, it is necessary to properly align the pneumatic cylinder during assembly in the chair or table such that the cable control is correctly positioned for coupling to an actuator, lever, or button. Slight misalignment can cause excessive wear during use or inoperability of the control. There exists a need, therefore, for a pneumatic cylinder valve control which facilitates installation and which allows adjustability of the exit position of the control cable therefor and one which can be used with existing cylinder designs.

SUMMARY OF THE INVENTION

The control of the present invention satisfies this need by providing a housing made of a polymeric material which pivotally receives a control arm having a cable control receiving member at one end and which can be snap-fitted within an open end of a fluid cylinder after its manufacture. With such a system, the control can be installed in the fluid cylinder, such as a pneumatic cylinder, and rotated to position a cable control in any orientation within a 360° adjustment range to allow proper alignment of the cable control to the desired location. Such a universal snap-in control, therefore, can be used for left, right, middle, or any other location in, for example, a chair, thereby providing the manufacturer the options of locating the actuator, lever, or button at any desired position. The control system components can be molded of a suitable polymeric material and easily assembled, and subsequently snap-fitted within an existing pneumatic cylinder, thereby reducing the cost of a control system as well as providing desired flexibility for installation.

These and other features, objects and advantages of the present invention will become apparent upon reading the following description thereof together with reference to the accompanying drawings.

DETAILED DESCRIPTION OF THE PREFERRED EMBODIMENT

Figure 1:
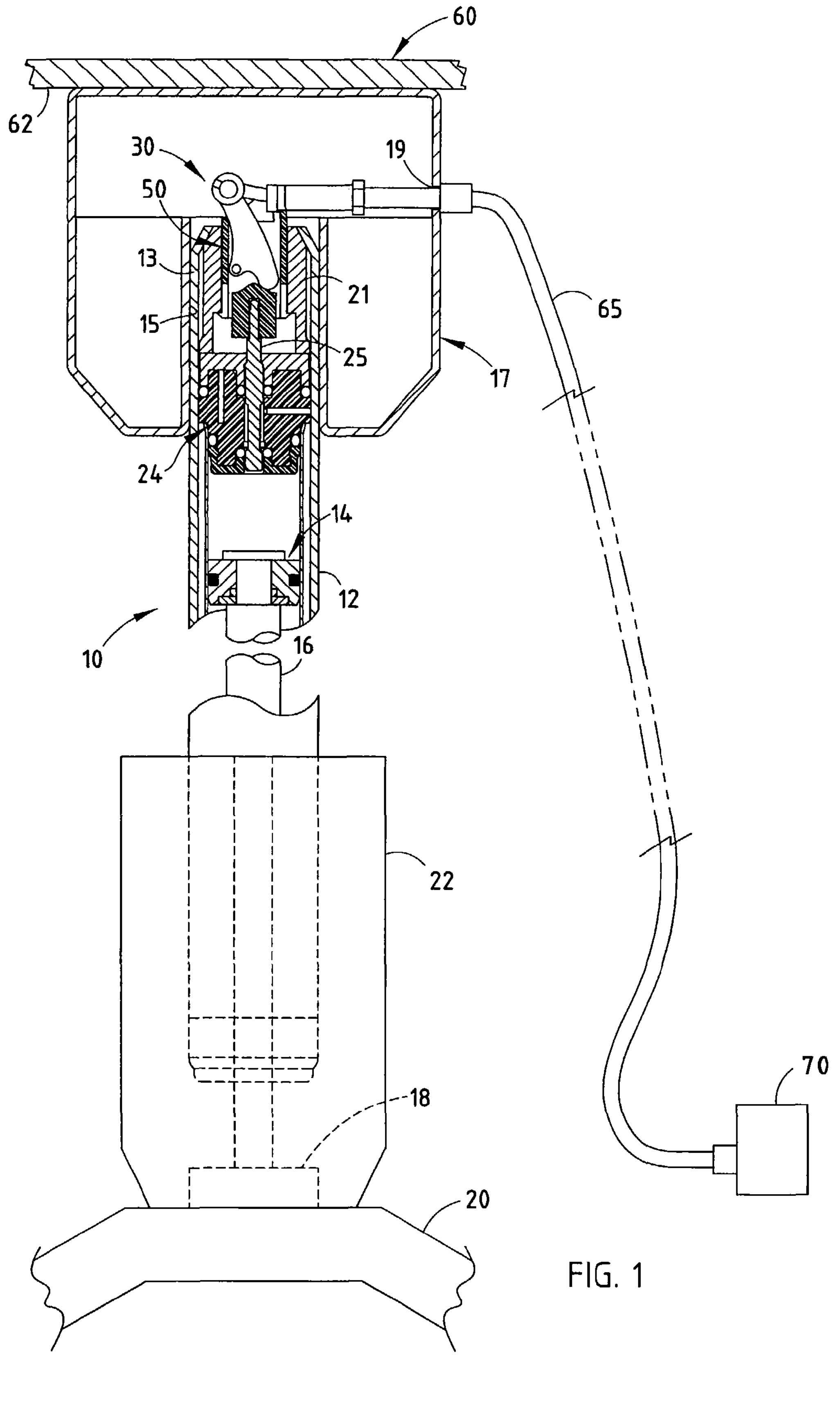
FIG. 1 is a vertical cross-sectional view, partly broken away, of a pneumatic cylinder installation embodying the control system of the present invention.

Referring initially to FIG. 1, there is shown a pneumatic cylinder 10 incorporating the control system of the present invention. Cylinder 10 includes an outer cylindrical housing 12 in which there is positioned a piston 14 coupled to a piston rod 16, which extends downwardly to a thrust bearing 18 coupled to a base 20, such as a chair base to allow rotation of the cylinder 10 with respect to the base 20. A cover sleeve 22 extends over the piston rod 16 and slidably engages the outer cylindrical surface of cylinder 10 to allow, upon actuation of the control valve 24 by the control assembly 30 of the present invention, a support member 60, such as the chair bottom to be vertically adjustable with respect to base 20. The upper end of cylinder 10 is tapered at 13 and is received in a tapered socket 15 of bracket 17 coupled to the bottom 62 of the chair or table 60. Opening 19 in bracket 17 provides access to the upper end of cylinder 10 and allows installation of the cable control 30, described below, and attachment of a release or control cable 65 thereto, which extends to a push-button (or other type) control 70 which can be positioned at any desired location within a chair or table due to the unique nature of the control 30.

Figure 2:
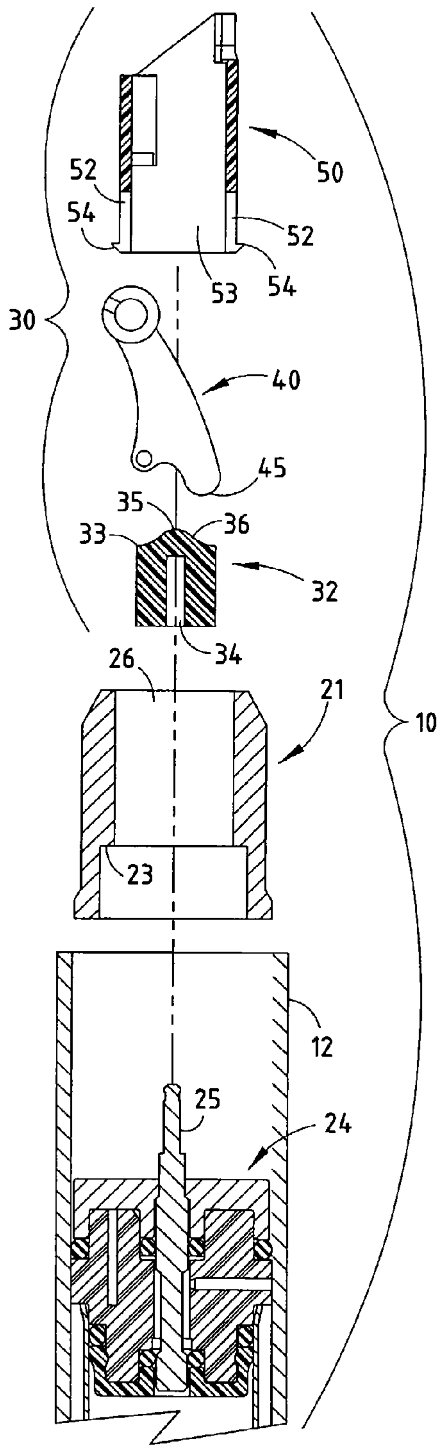
FIG. 2 is a fragmentary exploded view, partly in cross section, of the control system components and pneumatic cylinder.
Figure 6:
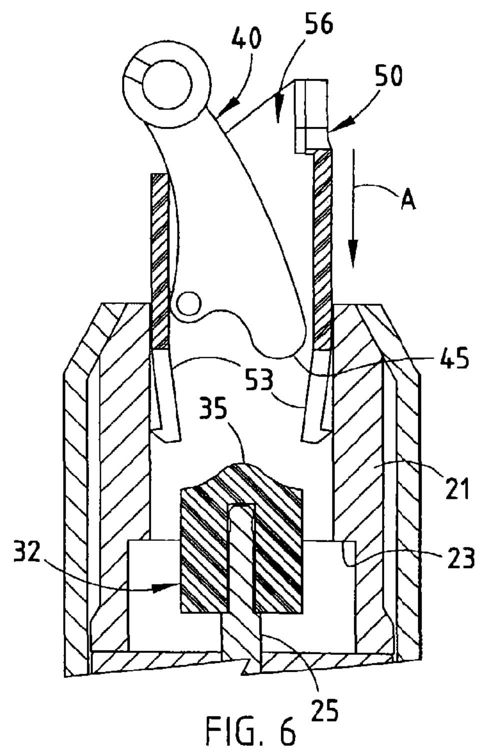
FIG. 6 is a vertical cross-sectional view showing the insertion of the control components of FIGS. 4 and 5 into a cylinder.
Figure 7:
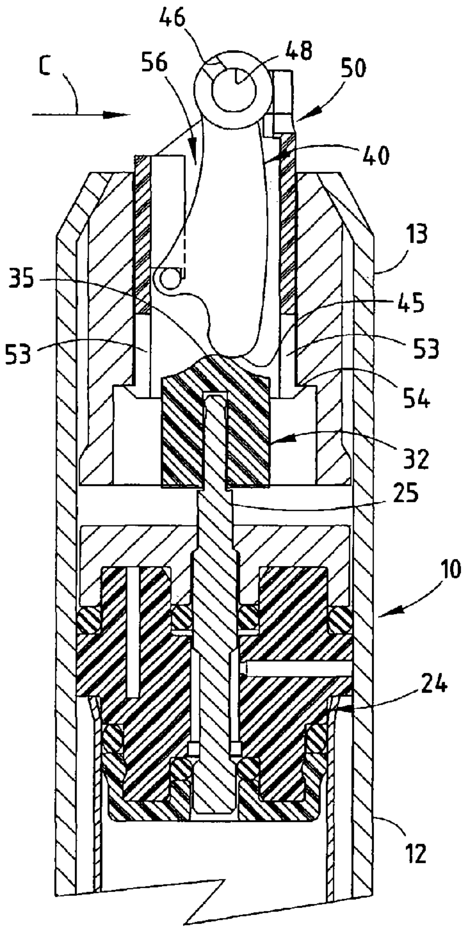
FIG. 7 is an enlarged fragmentary vertical cross-sectional view of the control elements shown in an assembled position in the valve open actuation position.

As best seen in FIGS. 1 and 7, valve 24 has a control element or rod 25 extending upwardly and which is selectively engaged by control 30 of the present invention. The cylinder 10 includes a valve spacer 21 which is crimped to the top opening of housing 12, as best seen in FIG. 6. Valve spacer 21 includes an annular undercut surface 23 (FIG. 2) which secures the snap-fit control 30 therein, as seen in FIGS. 1 and 7, once control 30 is inserted into the top opening 26 of spacer 21, as illustrated in FIG. 6.

Figure 3:
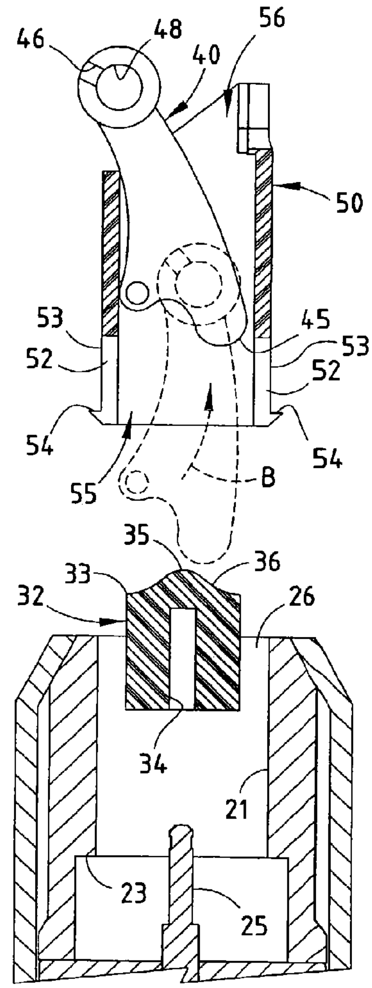
FIG. 3 is an enlarged fragmentary cross-sectional view showing the assembly of components of the control of the present invention.

Control 30 includes an actuating button 32 which includes a central axially extending blind aperture 34 for receiving control rod 25 of valve 24. As best seen in FIG. 3, button 32 includes a camming upper surface 36 which is elliptically curved from the outer edge 33 to the crown 35 to engage a rounded camming surface 45 on control arm 40 of control 30. The control arm 40 is pivotally received within housing 50, as described below.

Figure 4:
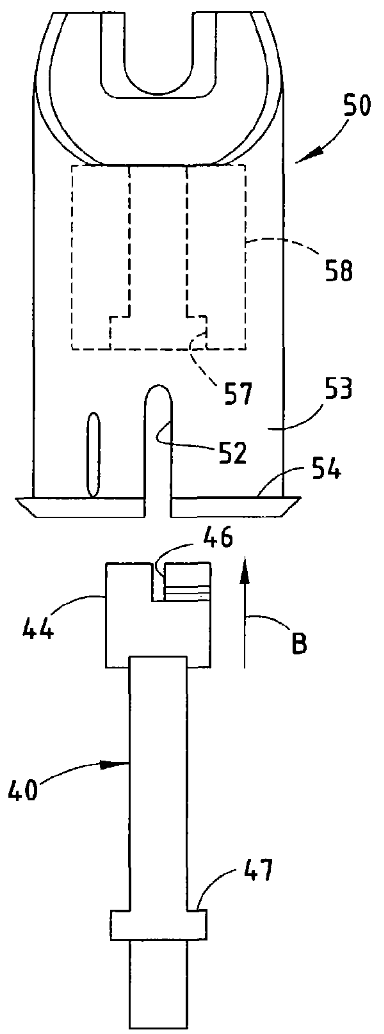
FIG. 4 is a left side elevational view of the housing and control arm shown in FIG. 3.
Figure 5:
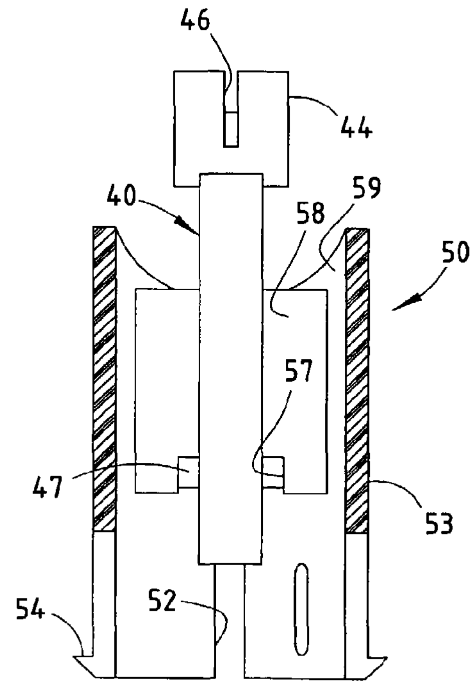
FIG. 5 is a right side view of the assembled structure shown in FIG. 3, shown partly in cross section.
Figure 8:
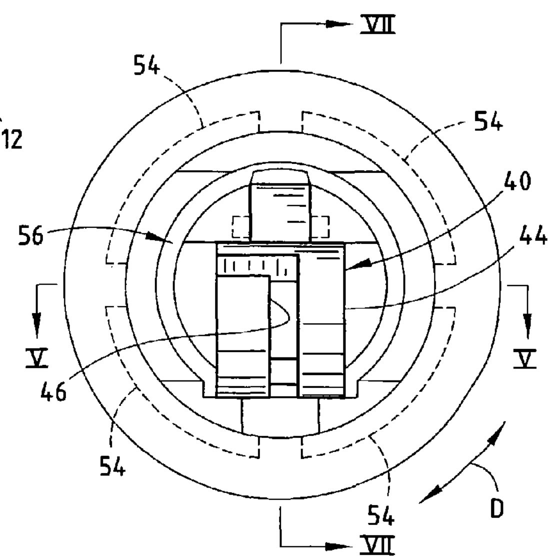
FIG. 8 is a top plan view of the control and cylinder shown in FIG. 7.

Housing 50 is generally cylindrical and includes vertical slots 52 along its lower cylindrical side wall to allow flexibility for the bottom outwardly projecting arcuate flanges 54, which engage the annular surface 23 of valve spacer 21, as best seen in FIGS. 1, 7, and 8, when assembled. The four 90° spaced slots 52 thereby define four resilient legs 53 of housing 50 (FIGS. 4 and 5) to allow them to deflect and extend within the cylindrical opening 26 of valve spacer 21 during insertion of the assembly, as illustrated by arrow A in FIG. 6. Housing 50 includes an open top 56 through which control arm 40 extends once assembled, as seen in FIG. 6. A cylindrical socket 57 (FIGS. 4 and 5) is formed in a mounting boss 58 on the inner cylindrical side 59 of the housing for receiving a pivot axle 47 on control arm 40. Control arm 40 is inserted upwardly into the lower open end 55 of housing 50, as illustrated by arrow B in FIGS. 3 and 4, until the pivot axle 47, extending from opposite sides of control arm 40, engages and snap-fits within socket 57.

The control cam 45 of control arm 40 is offset from pivot axle 47 such that pivotal movement of the upper end 44 of arm 40 will provide a mechanical advantage due to the spacing between pivot axle 47 and cam 45 and the greater distance between pivot axle 47 and end 44 to actuate control button 32 against the pneumatic pressure of valve control element or rod 25. End 44 of control arm 40 includes a radially and axially extending slot 46 for receiving a standard cylindrical end of a cable release 65 which can be extended within the cylindrical opening 48 of slot 46 and rotated until the cable is captively held to end 44 of control arm 40.

The actuating button 32, housing 50, and control arm 40 can all be individually integrally molded of a suitable polymeric material, such as acetal, which provides the necessary strength and rigidity and yet flexibility for the snap-insertion of housing 50 into valve spacer 21, as illustrated in FIG. 6, to an installed position, as shown in FIG. 7, in which the camming surface 45 of control arm 40 is shown in an opening position for valve 24. Thus, arm 40 is moved to the right, as shown by arrow C (FIG. 7) to depress button 32 actuating valve 22 for lowering the element 60 with respect to base 20.

Control 30 can, thus, be assembled to pneumatic cylinder 10 by inserting control button 32 downwardly through open end 26 of the spacer 21, positioning control arm 40 into housing 50 and subsequently snap-fitting the housing downwardly into opening 26 deflecting legs 53 until flanges 54 engaged the annular surface 23 of valve spacer 21, which snap-fits control 30 into open end 26 of pneumatic cylinder 10. The polymeric interface between the typically aluminum valve spacer 21 and the housing 50 allows the housing and control arm pivotally mounted thereto to rotate, as seen by arrow D in FIG. 8, through 360°, allowing positioning of release cable 65 at any desired location with respect to the element being controlled by cylinder 10. Thus, the control 30 will permit left side, right side, front, rear, or any incremental position therebetween for the positioning of push-button or other type of actuating control 70 on, for example, a chair base or arm or to the undersurface of a table at any desired location.

Typically, during manufacture of a chair, the cable release 65 and control 70 will be prepositioned and the coupling of the end of cable 65 to control 30 can be easily accommodated as the control cylinder 10 is secured to the chair base and undersurface of the chair to accommodate whatever position cable 65 is located. Thus, the system of the present invention provides a great degree of flexibility for the manufacturer and provides an inexpensive, durable, and flexible control for activating an adjustable fluid cylinder.

It will become apparent to those skilled in the art that various modifications to the preferred embodiment of the invention as described herein can be made without departing from the spirit or scope of the invention as defined by the appended claims.

The invention claimed is:

1. A control for a fluid cylinder comprising:

a cylindrical housing having a cylindrical opening extending therethrough, an upper end, and a lower end having outwardly projecting resilient tabs, said cylinder including a pivot axle receiving socket formed on an inner wall thereof; and a control arm including a pivot axle pivotally extending into said socket of said housing, said control arm including a cam surface positioned in spaced relationship to said pivot axle toward said resilient tabs and an opposite end extending through said open end of said cylindrical housing for receiving a control cable therein.

2. The control as defined in claim 1 wherein said lower end of said housing includes a plurality of angular spaced longitudinally extending slots.

3. The control as defined in claim 1 and further including a control button for engaging said cam surface of said control arm.

4. The control as defined in claim 3 wherein said button has a curved upper surface for engaging said cam surface.

5. The control as defined in claim 4 wherein said upper surface of said button is crowned.

6. The control as defined in claim 2 wherein said lower end of said housing includes four equally spaced slots.

7. The control as defined in claim 6 wherein said housing is made of a polymeric material.

8. The control as defined in claim 7 wherein said opposite end of said control arm includes a socket for receiving an end of a control cable.

9. A fluid cylinder comprising:

a cylinder having a piston rod, a cover sleeve for said piston rod, a control valve for adjusting the position of said piston rod, and a valve spacer positioned to hold said valve in said cylinder, said spacer having an open upper end;

a cylindrical housing having a cylindrical opening extending therethrough, an upper end, and a lower end having outwardly projecting resilient tabs, said cylinder including a pivot axle receiving socket formed on an inner wall thereof, said cylinder insertable into said open end of said valve spacer; and a control arm including a pivot axle pivotally extending into said socket of said housing, said control arm including a cam surface positioned in spaced relationship to said pivot axle toward said resilient tabs for engaging said control valve and an opposite end extending through said open end of said cylindrical housing for receiving a control cable therein.

10. The cylinder as defined in claim 9 wherein said valve spacer includes an annular surface and said tabs of said housing engage said annular surface for holding said housing within said cylinder.

11. The cylinder as defined in claim 10 wherein said housing rotates within said cylinder.

12. The cylinder as defined in claim 11 wherein said lower end of said housing includes a plurality of angular spaced longitudinally extending slots.

13. The cylinder as defined in claim 12 and further including a control button for engaging said cam surface of said control arm.

14. The cylinder as defined in claim 13 wherein said button has a curved upper surface for engaging said cam surface.

15. The cylinder as defined in claim 14 wherein said upper surface of said button is crowned.

16. The cylinder as defined in claim 15 wherein said lower end of said housing includes four equally spaced slots.

17. The cylinder as defined in claim 16 wherein said housing is made of a polymeric material.

18. The cylinder as defined in claim 17 wherein said opposite end of said control arm includes a socket for receiving an end of a control cable.

19. A control assembly for an adjustable pneumatic cylinder comprising:

a cylindrical polymeric housing having a cylindrical inner wall, an upper end, and a lower end having outwardly projecting resilient tabs, said cylinder including a pivot axle receiving socket formed on said inner wall;

a control arm including a pivot axle pivotally extending into said socket of said housing, said control arm including a cam surface positioned in spaced relationship to said pivot axle toward said resilient tabs and an opposite end extending through said open end of said cylindrical housing for receiving a control cable therein; and a control button for engaging said cam surface of said control arm.

20. The control as defined in claim 19 wherein said button has a curved upper surface terminating in a centrally located crown for engaging said cam surface of said central arm.

21. A pneumatic cylinder having a snap-in rotatable control, said cylinder comprising:

a pneumatic cylinder having a housing including a piston and piston rod which extends from said housing from one end; and an actuator mechanism for selectively controlling fluid to said piston at an opposite end;

wherein the improvement comprises a control horizontally rotatably coupled to said cylinder at said opposite end for engaging said actuator mechanism, such that said cylinder can be mounted within a structure and said control subsequently rotated to any horizontally angled position for the attachment of an actuating member thereto.

22. The pneumatic cylinder as defined in claim 21 wherein said rotatable control is snap-fitted into said opposite end of said cylinder.

23. A fluid cylinder and control comprising:

a fluid cylinder including an outer cylindrical housing having a cylindrical opening at an upper end;

a rotatable housing rotatably fitted within a spacer, said rotatable housing having a lower end with outwardly projecting resilient tabs for snap-fitting said rotatable housing into engagement with said cylindrical housing, said rotatable housing further including a pivot axle receiving socket formed on an inner wall thereof; and a control arm including a pivot axle pivotally extending into said socket of said rotatable housing, said control arm including a cam surface positioned in spaced relationship to said pivot axle toward said resilient tabs and an opposite end extending through said open end of said outer cylindrical housing for receiving a control cable therein, wherein said control arm can be rotated to any desired position for installing said fluid cylinder into a device.

24. The fluid cylinder as defined in claim 23 and further including an insert spacer extending within said cylindrical opening of said outer housing, wherein said insert spacer is fitted within said open end of said outer housing and said rotatable housing is snap-fitted and rotatably mounted within said insert spacer.

* * * * *

UNITED STATES PATENT AND TRADEMARK OFFICE

CERTIFICATE OF CORRECTION

PATENT NO. : 7,007,587 B2
APPLICATION NO. : 10/625324
DATED : March 7, 2006
INVENTOR(S) : James (NMI) Vander Zanden It is certified that error appears in the above-identified patent and that said Letters Patent is hereby corrected as shown below:

On the Title Page at (12) "Zanden" should be --Vander Zanden--.

Signed and Sealed this

Eighteenth Day of July, 2006

JON W. DUDAS
*Director of the United States Patent and Trademark Office*